(12) United States Patent
Arai et al.

(10) Patent No.: US 8,071,228 B2
(45) Date of Patent: Dec. 6, 2011

(54) PERPENDICULAR MAGNETIC RECORDING MEDIUM

(75) Inventors: Reiko Arai, Kanagawa (JP); Hiroyuki Suzuki, Kanagawa (JP); Masayoshi Shimizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 202 days.

(21) Appl. No.: 11/983,577

(22) Filed: Nov. 9, 2007

(65) Prior Publication Data

US 2008/0124583 A1 May 29, 2008

(30) Foreign Application Priority Data

Nov. 10, 2006 (JP) .................... 2006-305717

(51) Int. Cl.
*G11B 5/66* (2006.01)
(52) U.S. Cl. ...................................... 428/828
(58) Field of Classification Search ............... 428/828.1, 428/829, 830
See application file for complete search history.

(56) References Cited

U.S. PATENT DOCUMENTS

| | | | |
|---|---|---|---|
| 6,821,652 B1 * | 11/2004 | Okamoto et al. ........... 428/828.1 |
| 2002/0127433 A1 * | 9/2002 | Shimizu et al. ........ 428/694 TM |
| 2004/0265636 A1 * | 12/2004 | Doerner et al. ............ 428/694 T |
| 2005/0244679 A1 * | 11/2005 | Arai et al. .................... 428/828 |
| 2006/0177702 A1 * | 8/2006 | Ajan .......................... 428/828.1 |
| 2006/0204791 A1 * | 9/2006 | Sakawaki et al. ......... 428/828.1 |
| 2006/0228587 A1 * | 10/2006 | Kuboki ......................... 428/829 |

FOREIGN PATENT DOCUMENTS

| | | |
|---|---|---|
| JP | 06-103554 A | 4/1994 |
| JP | 07-129946 A | 5/1995 |
| JP | 11-191217 A | 7/1999 |
| JP | 2001-155321 A | 6/2001 |
| JP | 2004-118894 A | 4/2004 |

OTHER PUBLICATIONS

Moon et al. "Magnetic Properties and Electronic Structures of (Ru,Fe) and (Rh,Fe) Alloys." Journal of the Korean Physical Society. 36.1 (2000): 49-53.*

* cited by examiner

*Primary Examiner* — Holly Rickman
*Assistant Examiner* — Lisa Chau
(74) *Attorney, Agent, or Firm* — Zilka-Kotab, PC (57) ABSTRACT

Embodiments of the present invention provide a perpendicular magnetic recording medium which does not cause medium noise to increase due to soft magnetic underlayers, is capable of easily controlling the thickness of a nonmagnetic layer disposed between soft magnetic underlayers, and capable of improving the corrosion resistance of the soft magnetic underlayers. According to one embodiment, in a perpendicular magnetic recording medium, an adhesion layer is formed on a substrate, a soft magnetic underlayer is formed on the adhesion layer, a seed layer and an intermediate layer are formed above the soft magnetic underlayer, and a perpendicular layer is formed on the intermediate layer. The soft magnetic underlayer has a first soft magnetic layer, a second first soft magnetic layer, and an antiferromagnetic coupling layer disposed between the first soft magnetic layer and the second soft magnetic layer, the first soft magnetic layer and the second soft magnetic layer are formed of an alloy comprising Fe as a main ingredient, the antiferromagnetic coupling layer is formed of an Ru—Fe alloy, and an Fe content is from 40 at % to 75 at %.

13 Claims, 7 Drawing Sheets

| Sample | Antiferromagnetically coupling layer | Medium S/N (dB) | MCW ($\mu$m) | Rand for corrosion resistance |
|---|---|---|---|---|
| 1-1 | $RuFe_{20}$ | 20.0 | 0.167 | B |
| 1-2 | $RuFe_{25}$ | 20.1 | 0.164 | B |
| 1-3 | $RuFe_{30}$ | 20.1 | 0.158 | B |
| 1-4 | $RuFe_{40}$ | 20.0 | 0.155 | B |
| 1-5 | $RuFe_{50}$ | 20.2 | 0.148 | A |
| 1-6 | $RuFe_{60}$ | 20.0 | 0.148 | A |
| 1-7 | $RuFe_{70}$ | 20.1 | 0.142 | A |
| 1-8 | $RuFe_{75}$ | 20.1 | 0.143 | A |
| 1-9 | $RuFe_{80}$ | 18.3 | 0.150 | A |
| 1-10 | Ru | 20.1 | 0.166 | B |

| | Target composition (at%) | Ar gas pressure (Pa) | Rate (nm/s) | Thickness (nm) |
|---|---|---|---|---|
| Adhesion layer 12 | $Al_{50}Ti_{50}$ | 0.5 | 5 | 10 |
| Soft magnetic underlayer 13 — First soft magnetic layer 131 | $Fe_{50}Co_{35}Ta_{10}Zr_5$ | 0.5 | 12.5 | 30 |
| Soft magnetic underlayer 13 — Nonmagnetic layer 132 | $RuFe_{0\sim80}$ | 1 | 0.7 | 0.2~1.2 |
| Soft magnetic underlayer 13 — Second soft magnetic layer 133 | $Fe_{50}Co_{35}Ta_{10}Zr_5$ | 0.5 | 12.5 | 30 |
| Seed layer 14 | $Ni_{63}Ta_{37}$ | 0.5 | 1 | 2 |
| Intermediate layer 15 | Ru | 1 / 5.5 | 4 / 1.5 | 8 / 8 |
| Recording layer 16 — First recording layer 161 | $CoCr_{17}Pt_{18}$–$8molSiO_2$ | 2 | 1 | 14 |
| Recording layer 16 — Second recording layer 162 | $CoCr_{23}Pt_{10}$ | 1 | 1 | 7 |
| Protective layer 17 | Carbon | 0.6 | 1 | 4 |

| Sample | Antiferromagnetically coupling layer | Medium S/N (dB) | MCW (μm) | Rand for corrosion resistance |
|---|---|---|---|---|
| 1-1 | RuFe$_{20}$ | 20.0 | 0.167 | B |
| 1-2 | RuFe$_{25}$ | 20.1 | 0.164 | B |
| 1-3 | RuFe$_{30}$ | 20.1 | 0.158 | B |
| 1-4 | RuFe$_{40}$ | 20.0 | 0.155 | B |
| 1-5 | RuFe$_{50}$ | 20.2 | 0.148 | A |
| 1-6 | RuFe$_{60}$ | 20.0 | 0.148 | A |
| 1-7 | RuFe$_{70}$ | 20.1 | 0.142 | A |
| 1-8 | RuFe$_{75}$ | 20.1 | 0.143 | A |
| 1-9 | RuFe$_{80}$ | 18.3 | 0.150 | A |
| 1-10 | Ru | 20.1 | 0.166 | B |

Fig.10

| Sample | Soft magnetic layer | Medium S/N (dB) | MCW ($\mu$m) | Rank for corrosion resistance |
|---|---|---|---|---|
| 1-7 | $Fe_{50}Co_{35}Ta_{10}Zr_5$ | 20.1 | 0.142 | A |
| 2-1 | $Fe_{45}Co_{40}Ta_{10}Zr_5$ | 20.1 | 0.145 | A |
| 2-2 | $Fe_{60}Co_{25}Ta_{10}Zr_5$ | 20.0 | 0.146 | A |
| 2-3 | $Fe_{48}Co_{32}Ta_{10}Zr_5B_5$ | 20.1 | 0.145 | A |
| 2-5 | $Fe_{51}Co_{34}Ta_{10}B_5$ | 20.4 | 0.142 | B |
| 2-6 | $Fe_{48}Co_{32}Ta_{10}B_{10}$ | 20.1 | 0.144 | B |
| 2-7 | $Fe_{51}Co_{34}Ta_5Zr_5Mo_5$ | 20.2 | 0.143 | A |

Fig.11

| Sample | Antiferromagnetically coupling layer | Medium S/N (dB) | MCW ($\mu$m) | Rank for corrosion resistance |
|---|---|---|---|---|
| 3-1 | $RuFe_{50}Cr_{10}$ | 20.0 | 0.149 | A |
| 3-2 | $RuFe_{60}Cr_{10}$ | 20.1 | 0.148 | A |
| 3-3 | $RuFe_{70}Cr_5$ | 20.0 | 0.145 | A |
| 3-4 | $RuFe_{40}Co_{10}$ | 20.3 | 0.147 | B |
| 3-5 | $RuFe_{50}Co_{10}$ | 20.2 | 0.145 | A |
| 3-6 | $RuFe_{60}Co_5$ | 20.1 | 0.145 | A |

PERPENDICULAR MAGNETIC RECORDING MEDIUM

CROSS-REFERENCES TO RELATED APPLICATIONS

The instant nonprovisional patent application claims priority to Japanese Patent Application No. 2006-305717 filed Nov. 10, 2006 and which is incorporated by reference in its entirety herein for all purposes.

BACKGROUND OF THE INVENTION

In recent years, increasing the capacity of magnetic recording apparatus has been demanded and improvement in the recording density has been required since a magnetic disk of a small size and large capacity is mounted not only in personal computers but also in electric products for home use, for example. While development of magnetic heads, magnetic recording media, etc., has been conducted vigorously, the main stream of the recording system has been transited from the in-plane magnetic recording system to the perpendicular magnetic recording system and a further improvement of the recording density has become possible. In the perpendicular magnetic recording medium, it has been known that the efficiency of the recording magnetic field from the magnetic head can be improved by using a two-layered perpendicular magnetic recording medium having a soft magnetic underlayer and this can cope with increases in the coersivity of the recording film.

For the soft magnetic underlayer, a soft magnetic material of high saturation magnetic flux density (Bs) may be formed as compared with that of a recording layer in order to circulate the recording magnetic field from a magnetic head and, accordingly, noise due to the soft magnetic underlayer has caused a problem. The main cause of the noise is attributable to the leakage magnetic field from magnetic walls formed in the soft magnetic layer, and a method of suppressing the formation of the magnetic walls or a method of decreasing the leakage magnetic field has been studied so far.

For example, as disclosed in Japanese Patent Publication No. 7-129946 ("Patent Document 1") and Japanese Patent Publication No. 11-191217 ("Patent Document 2"), there have been proposed a method of disposing a hard magnetic pinning layer between a soft magnetic underlayer and a substrate thereby aligning the magnetization of the soft magnetic underlayer in one direction, or a method of suppressing the movement of magnetic walls in the soft magnetic underlayer by exchange coupling with antiferromagnetism with the direction of the magnetic spins being aligned as disclosed in Japanese Patent Publication No. 6-103554 ("Patent Document 3"). Further, as disclosed in Japanese Patent Publication No. 2001-155321 ("Patent Document 4"), there has been proposed a method of constituting the soft magnetic underlayer with two or more soft magnetic layers separated from each other by a nonmagnetic layer and using Ru for the nonmagnetic layer thereby antiferromagnetically exchange coupling the two soft magnetic underlayers. The stacked soft magnetic layers aligned anti-parallel each other less generates leakage magnetic field from magnetic walls, spike noises or demagnetization of recording magnetization can be suppressed without a magnetic domain control layer and the robustness for stray magnetic field is also improved. Japanese Patent Publication No. 2005-302238 ("Patent Document 5") describes that since the magnetic flux circulates between the layers by making the magnetic moment equal between the antiferromagnetically coupled two amorphous soft magnetic layers, this has a great effect for suppressing the spike noise and the amplitude modulation of reproduced signals, and this can provide an effect of improving the robustness against stray magnetic field by providing a uniaxial anisotropy in the radial direction of the first amorphous soft magnetic layer and the second amorphous soft magnetic layer to decrease the coersivity. Further, Patent Document 5 describes that the antiferromagnetic coupling exerting between amorphous soft magnetic layers can be strengthened by making the nonmagnetic layer into a sandwich structure put between Co series ferromagnetic layers, or by using RuCo or RuFe for the nonmagnetic layer.

As described above, the material used for soft magnetic underlayer is not particularly restricted so long as it has high Bs, is provided with a uniaxial anisotropy in the radial or circumferential direction of a disk substrate, and excellent in the surface planarity, and amorphous alloys comprising Co or Fe as the main ingredient have been used so far. However, a problem that the soft magnetic underlayer of a perpendicular magnetic recording medium suffers from corrosion has been arisen recently and it has been found that corrosion tends to occur particularly in a case of using Co alloys. Since Co alloys are not excellent in the corrosion resistance and have an extremely basic potential in the circumstance of an aqueous solution, they suffer from galvanic corrosion (corrosion between different kinds of metals) relative to an adjacent intermediate layer. Since Ru or Ru alloys well known as the intermediate layer has an extremely high potential because they are noble metal and the potential difference between both of them reaches as high as about 1.0 V, corrosion of the Co alloy is extremely accelerated by the galvanic corrosion than the corrosion for a single element. On the other hand, Fe series alloys have a relatively high potential although their corrosion resistance is not so different from that of the Co alloys and scarcely cause galvanic corrosion even when they are in adjacent with Ru.

As described above, a method of separating the two soft magnetic layers by the Ru nonmagnetic layer and antiferromagnetically exchange-coupling them is extremely effective in that noise due to the soft magnetic underlayer is eliminated. The optimized thickness of the Ru nonmagnetic layer for maximizing the exchange-coupling of the soft magnetic layer is different depending on the material of the soft magnetic layer. In a case of using a Co alloy for the soft magnetic layer, the optimized film thickness of the Ru is about 1 nm, whereas the optimized film thickness as thin as 0.4 nm in a case of using an Fe alloy material. Further, in a case of using the Fe alloy material for the soft magnetic layer, since the dependence of the exchange-coupled magnetic field on the thickness of the Ru film is large compared with the case of using the Co alloy as to be described later, the margin for the film thickness is narrow and control thereof is difficult in view of the mass production.

BRIEF SUMMARY OF THE INVENTION

Embodiments in accordance with the present invention provide a perpendicular magnetic recording medium which does not cause medium noise to increase due to soft magnetic underlayers, is capable of easily controlling the thickness of a nonmagnetic layer disposed between soft magnetic underlayers, and is capable of improving the corrosion resistance of the soft magnetic underlayers. According to the particular embodiment disclosed in FIG. 1, in a perpendicular magnetic recording medium, an adhesion layer 12 is formed on a substrate 11, a soft magnetic underlayer 13 is formed on the adhesion layer, a seed layer 14 and an intermediate layer 15 are formed above the soft magnetic underlayer, and a perpendicular layer 16 is formed on the intermediate layer. The soft magnetic underlayer 13 has a first soft magnetic layer 131, a second first soft magnetic layer 133, and an antiferromagnetic coupling layer 132 disposed between the first soft magnetic layer 131 and the second soft magnetic layer 133, the first soft magnetic layer 131 and the second soft magnetic layer 133 are formed of an alloy comprising Fe as a main ingredient, the antiferromagnetic coupling layer 133 is formed of an Ru—Fe alloy, and an Fe content is from 40 at % to 75 at %.

DETAILED DESCRIPTION OF THE INVENTION

Embodiments of the present invention relate to a magnetic recording medium, and particular embodiments relate to a perpendicular magnetic recording medium suitable for high density magnetic recording.

In view of the above, embodiments of the present invention to provide a magnetic recording medium not lowering the exchange coupling magnetic field of the soft magnetic underlayer, easy for the control of the film thickness of the nonmagnetic layer interposed between the soft magnetic underlayers and also excellent in the corrosion resistance of the soft magnetic underlayer.

To attain the foregoing purpose, a perpendicular recording medium according to embodiments of the invention includes a substrate, an adhesion layer formed on a substrate, a soft magnetic underlayer formed on the adhesion layer, a seed layer and an intermediate layer formed above the soft magnetic underlayer, and a perpendicular recording layer formed on the intermediate layer, in which the soft magnetic underlayer has a first soft magnetic layer, a second soft magnetic layer, and an antiferromagnetic coupling layer disposed between the first soft magnetic layer and the second soft magnetic layer, the soft magnetic layer is formed of an alloy comprising Fe as a main ingredient, and the antiferromagnetic coupling layer is formed of an Ru—Fe alloy, and the Fe content is from 40 at % to 75 at %.

Cr or Co can be added to the Ru—Fe alloy as the antiferromagnetic coupling layer. Addition of Cr has an effect for the corrosion resistance of a target and, on the other hand, addition of Co has an effect for the magnetic characteristic of the soft magnetic underlayer (high Hex, high Hs).

Embodiments of the present invention can provide a perpendicular magnetic recording medium not lowering the exchange-coupled magnetic field of the soft magnetic underlayer, easy for the control of the thickness of the nonmagnetic layer interposed between the soft magnetic underlayers and also excellent in the corrosion resistance of the soft magnetic underlayer.

The perpendicular magnetic recording medium was manufactured by using a sputtering apparatus manufactured by ANELVA (C3010). The sputtering apparatus has ten process chambers and one substrate introduction chamber in which each of the chambers is evacuated independently. The evacuation performance of all of the chambers is $6 \times 10^{-6}$ Pa or less.

In the perpendicular magnetic recording medium according to embodiments of the invention, the adhesion layer is formed on the substrate, the soft magnetic underlayer is formed on the adhesion layer, the intermediate layer is formed on the soft magnetic underlayer, and a perpendicular recording layer is formed on the intermediate layer.

As a substrate, a glass substrate, an Al alloy substrate coated with an NiP plating film, a ceramic substrate such as of silicone and, further, a substrate formed with concentric grooves on the surface by texturing fabrication can be used.

The material for the adhesion layer is not particularly restricted so long as it has good adhesion with the substrate and the soft magnetic underlayer formed thereon and it is excellent in the surface planarity and the adhesion layer is preferably formed of an alloy containing at least two or more of metals of Al, Ti, Ni, Ta, Cr, Zr, Co, Hf, Si, and B. More specifically, AlTi, NiTa, AlTa, CrTi, CoTi, NiTaZr, NiCrZr, CrTiAl, CrTiTa, CoTiNi, CoTiAl, etc. can be used.

The soft magnetic underlayer preferably has at least 1 Tesla or more of saturated magnetic flux density (Bs), is provided with a uniaxial anisotropy in the radial direction of a disk substrate, and has a coersivity of 1.6 kA/m or less as measured in a head running direction. Specifically, the characteristics described above can be obtained easily by using an amorphous alloy or microcrystalline alloy comprising Fe as a main ingredient with addition of Co, Ta, Hf, Nb, Zr, Si, B, C, Mo, etc. thereto. By using the layer at a thickness of 100 nm or less, spike noise can be suppressed and the stray magnetic field strength can be improved.

To reduce the noise of the soft magnetic underlayer further, a nonmagnetic layer interposed between the soft magnetic underlayers, and soft magnetic underlayers are antiferromagnetically coupled by way of the nonmagnetic layer. In the case where the magnetic moments are made equal between the upper soft magnetic layer and the lower soft magnetic layer of the nonmagnetic layer, the magnetic fluxes circulate between both of the layers to stabilize the state of magnetic domains more in both of the layers, which is preferred. As the material for the nonmagnetic layer, RuFe, or RuFeX (in which X is Cr or Co) is used preferably.

To provide the soft magnetic underlayer with uniaxial anisotropy reliably, it is preferred to apply a cooling step in the magnetic field. The magnetic field is preferably applied in the radial direction of a substrate, magnetization in the radial direction of the soft magnetic layer has to be saturated and the magnitude of the magnetic field may be at least 4 kA/m or more on the disk substrate. For the cooling temperature, it is theoretically desired to cool down to a room temperature and it is practical to lower the temperature to about 60 to 100° C. while considering the shortening of the processing time in the medium production. Further, the cooling step may not necessarily be introduced after the formation of the soft magnetic layer but it may also be introduced after forming the seed layer, the intermediate layer, or the recording layer depending on the process of forming the medium.

As the intermediate layer, alloys of hexagonal close packed structure (hcp) or face-centered cubic lattice structure (fcc), or an alloy having a granular structure comprising Ru element or Ru as a main ingredient can be used. Further, while the intermediate layer may be a single layered film it may also be a stacked film using materials of different crystal structures. Further, for improving the crystal orientation in the intermediate layer, it is more preferred to form a seed layer (crystal orientation layer) on the soft magnetic underlayer.

As the perpendicular recording layer, an alloy at least containing Co and Pt can be used. Further, an alloy having a granular structure comprising CoCrPt as a main ingredient to which an oxide is added, specifically, $CoCrPt$—$SiO_2$, $CoCrPt$—$MgO$, $CoCrPt$—$TaOx$, $CoCrPt$—$TiOx$, etc. can be used. A stacked structure of using the oxide granular layer as a first recording layer on which a second recording layer comprising CoCr not containing an oxide as a main ingredient is formed can also be used. Further, artificial lattice films such as (Co/Pd) multilayered film, (CoB/Pd) multilayered film, (Co/Pt) multilayered film, (CoB/Pt) multilayered film, etc., can be used.

As the protective layer of the perpendicular recording layer, it is preferred to form a film of a thickness of 2 nm or more and 6 nm or less mainly comprising carbon, and further use a lubrication layer such as of perfluoro alkyl polyether. This can provide a perpendicular recording medium of high reliability.

The reading/writing characteristics of media were evaluated by a spin stand. The head used for the evaluation is a composite head having a TS (Trailing Shield) type writer for writing and a spin valve type reader for reading together. The shield-to-shield gap is 50 nm and a track width is 120 nm for the reader. The writing current was set to 40 mA. A disk plate with a radius of 23 mm was measured by 0.014 sec/rev (4200 rpm) at a skew angle of 0°. The medium S/N was determined as a ratio of read output and integration noise when writing signals at a linear recording density of 18.8 kfc/mm (18.8 kilo flux change per 1 mm). MCW showing the recording track width was calculated, after writing signals at 6.26 kfc/mm on both sides, by overwriting signals at 3.76 kfc/mm at the central portion and from the off-track profile of signals remaining on the right and left.

Evaluation for the corrosion resistance of a medium was conducted by the following procedures. At first, a sample was left under a condition in a high temperature and high humidity state at a temperature of 60° C. and a relative humidity of 90% or higher for 96 hours. Then, the number of corrosion points within a radial range from 14 mm to 25 mm was counted by using an optical surface analyzer and ranked as below. It was evaluated as A for less than 30, as B for 30 or more and less than 80, and as C for 80 or more as the counted number. Ranks of B or higher are desired with a practical point of view.

Embodiments of the invention are described with reference to the drawings.

First Embodiment

Figure 1:
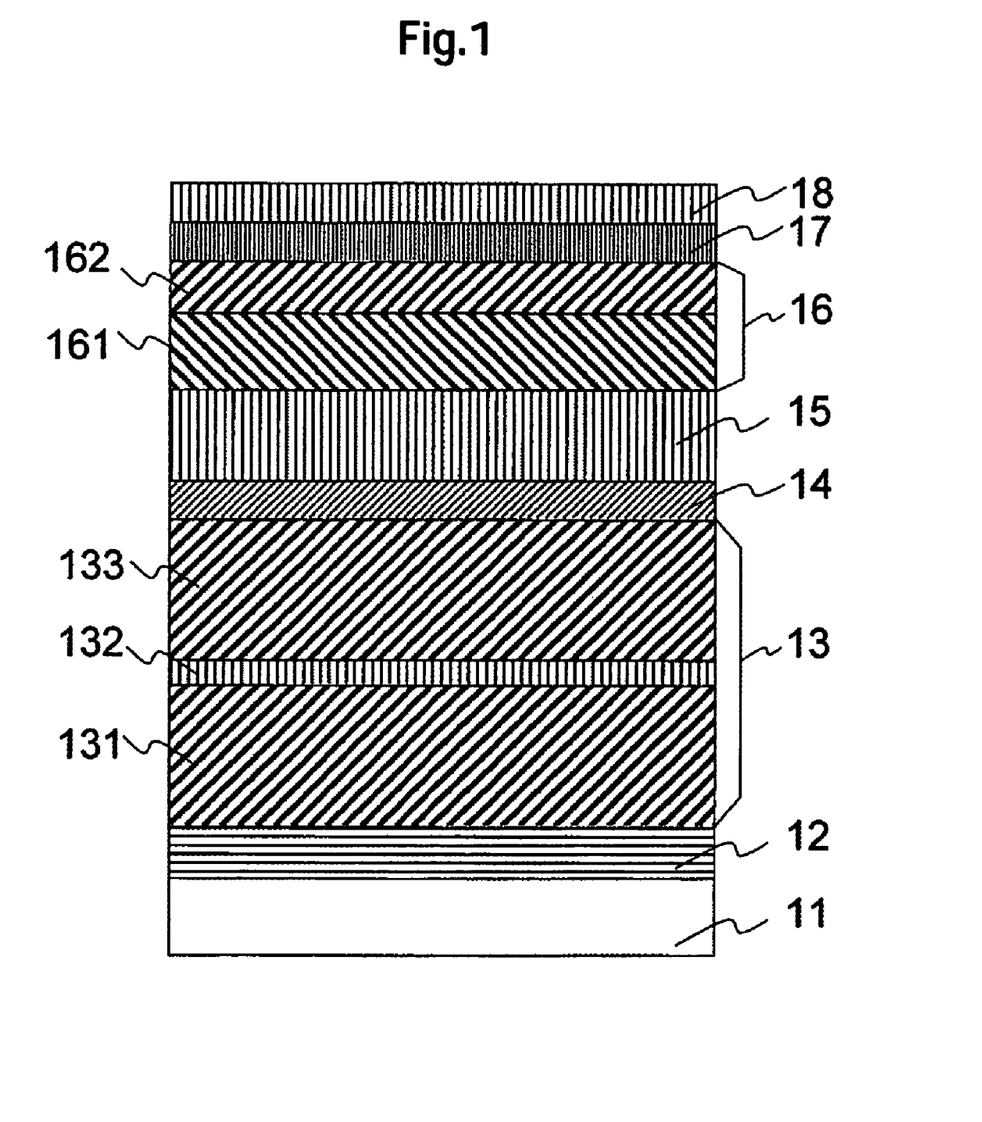
FIG. 1 is a view showing a layer constitution of a perpendicular magnetic recording medium of a first embodiment.
Figure 2:
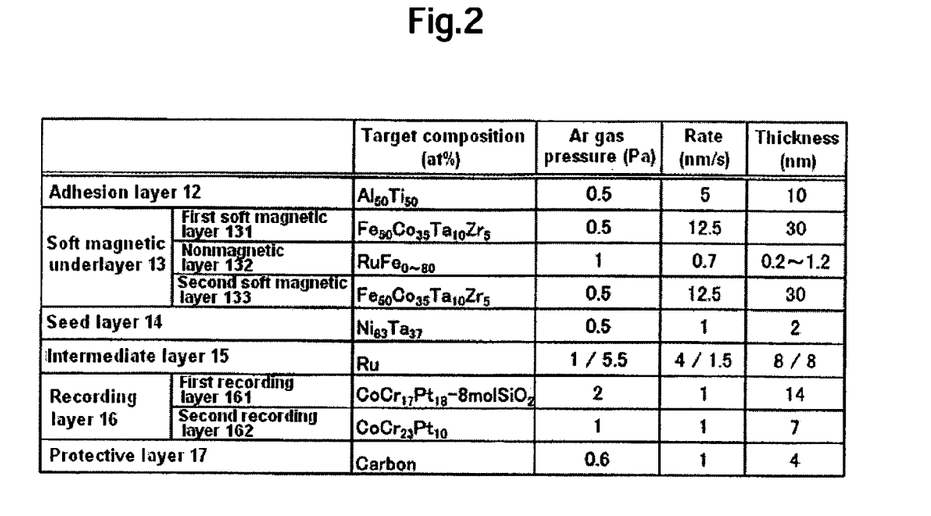
FIG. 2 is a view showing target compositions, an Ar gas pressure and thickness used in the first embodiment.

FIG. 1 shows a layer constitution of a perpendicular magnetic recording medium according to a first embodiment. A glass disk substrate of 0.635 mm thickness and 65 mm diameter (2.5 inch type) formed with concentric grooves on the surface was used as a substrate 11. An adhesion layer 12, a soft magnetic underlayer 13, a crystal orientation layer 14, an intermediate layer 15, a perpendicular recording layer 16, and a protective layer 17 were formed successively by a sputtering method, and a lubricant 18 was coated. FIG. 2 shows target compositions, Ar gas pressure and film thickness used in the first embodiment.

AlTi as the adhesion layer 12 was formed to 10 nm on the substrate 11, and FeCoTaZr as the first soft magnetic layer 131 at a thickness of 30 nm, RuFe as the antiferromagnetic coupling layer 132 at 0.2 to 1.2 nm, and FeCoTaZr as a second soft magnetic layer 133 at 30 nm were formed successively thereon, and the substrate 11 was cooled in a magnetic field down to about 80° C. or lower. Further, NiTa as the seed layer 14 was formed to 2 nm, and Ru as the intermediate layer 15 was formed to 16 nm while being divided into two layers (at a gas pressure 1 Pa and at a sputtering rate of 4 nm/s for the lower half and at a gas pressure of 5.5 Pa and at a sputtering rate of 1.5 nm/s for the upper half). Further, $CoCrPt$—$SiO_2$ with a thickness of 14 nm as the first recording layer 161 nm and CoCrPt with a thickness of 7 nm as the second recoding layer 162 were stacked to form a recording layer 16, on which a carbon layer as the protective layer 17 was formed to a thickness of 5 nm. Then, a lubricant 18 formed by diluting a perfluoroalkyl polyether type material with a fluorocarbon material was coated, and the burnishing was applied to the surface to manufacture a perpendicular recording medium according to the first embodiment. Ar was used as the sputtering gas and oxygen was added at a partial pressure of 20 mPa upon forming the magnetic recording layer. Upon forming the protective layer 17, nitrogen was added at a partial pressure of 50 mPa to the Ar pressure at 0.6 Pa upon film formation.

Figure 3A:
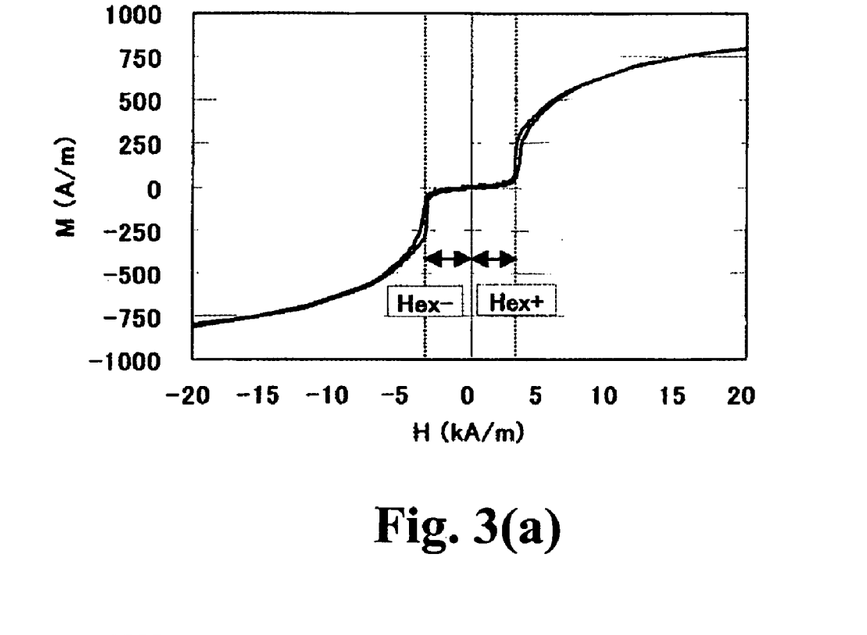
FIGS. 3(a) and 3(b) are graphs showing a magnetization curve of a soft magnetic underlayer of a perpendicular magnetic recording medium according to the first embodiment.
Figure 3B:
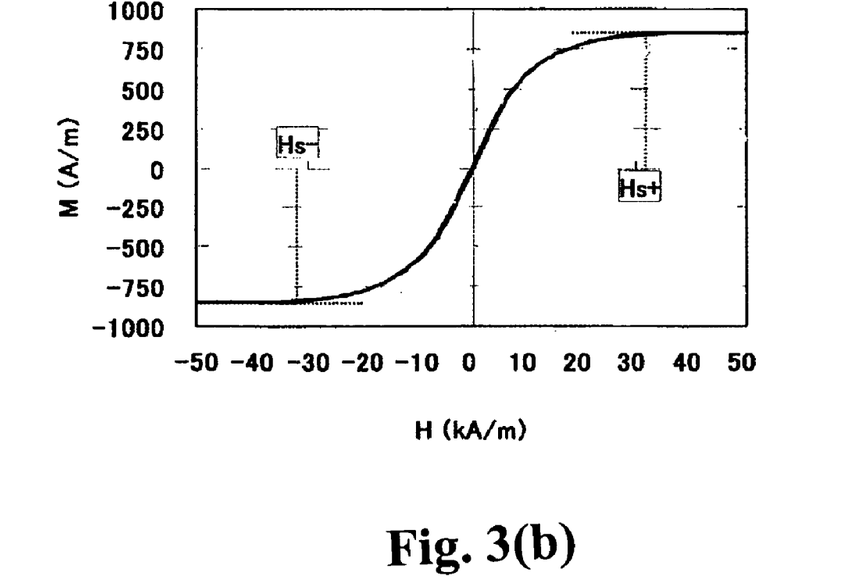

The magnetic characteristic for the soft magnetic underlayer 13 of the perpendicular recording medium according to the first embodiment was evaluated by using a sample vibration magnetometer (VSM). A magnetization curve was measured in the radial direction and the circumferential direction of a sample cut to 8 mm square with the position at 23 mm radius of the perpendicular recording medium as a center. FIG. 2 shows the typical result thereof. The magnetization curve measured by applying a magnetic field in the radial direction of the substrate shown in FIG. 3(a) is in a stepped shape having a stable level within a certain range including a zero magnetic field. This shows that the axis of easy magnetization of the soft magnetic underlayer is directed radially showing that the first soft magnetic layer 131 and the second soft magnetic layer 133 are antiferromagnetically coupled within the range of magnetic fields at a stable level. The magnetic field transiting from the stable level is defined as an exchange coupled magnetic field Hex. In the magnetization curve of FIG. 3(a) showing the actual result of measurement, Hex$^+$ and Hex$^-$ in the graph as the maximal value of the gradient are substantially symmetric with respect to the axis Y as the center, are substantially equal in view of the magnitude, and the average value of them is defined as the exchange coupled magnetic field Hex of the soft magnetic underlayer. On the other hand, the magnetization curve measured by applying a magnetic field in the circumferential direction of the substrate changes monotonously from the original point to the vicinity of the saturation magnetic field. The saturation magnetic field is defined as Hs which is an average for Hs$^+$ and Hs$^-$ in the graph in the same manner as in Hex.

Figure 4:
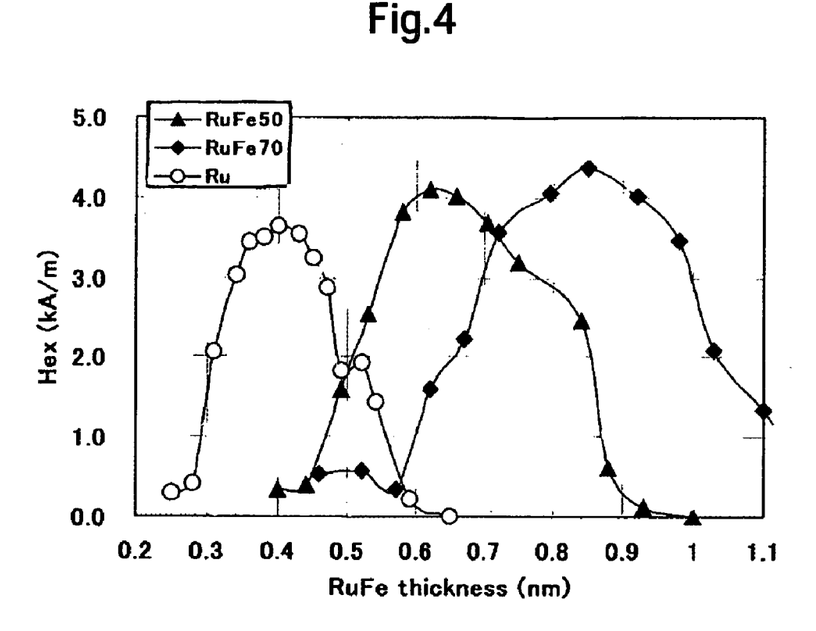
FIG. 4 is a graph showing a relation between the thickness of RuFe as an antiferromagnetic coupling layer and an antiferromagnetically coupled magnetic field Hex of a perpendicular magnetic recording medium according to the first embodiment.

Then, the dependence of Hex on the film thickness was examined while changing the film thickness of RuFe as the antiferromagnetic coupling layer 132. FIG. 4 shows the result. In this case, the Fe additive amount in RuFe is 50 at % and 70 at %. For comparison, a sample using Ru for the antiferromagnetic coupling layer 132 was provided and evaluated in the same manner. Other layer constitutions of the comparative example are identical with those in the first embodiment. Hex has a peak for the film thickness of RuFe or Ru. The peak value for RuFe is larger compared with that of Ru, and RuFe$_{50}$ was 4.10 kA/m and RuFe$_{70}$ was 4.38 kA/m relative to Ru of 3.64 kA/m. Further, for the film thickness showing the peak value, it was found that while it was 0.4 nm for Ru, it was 0.62 nm for RuFe$_{50}$, and 0.85 nm for RuFe$_{70}$, and it was shifted to the thicker side as the Fe additive amount increased. Further, it was found that the film thickness at which Hex was 3.2 kA/m or more was from 0.35 to 0.45 nm for Ru, from 0.55 to 0.75 nm for RuFe$_{50}$ and from 0.7 to 1.0 nm for RuFe$_{70}$, and the margin for the film thickness was also widened for RuFe relative to Ru and as Fe additive amount increased more for RuFe.

Figure 5:
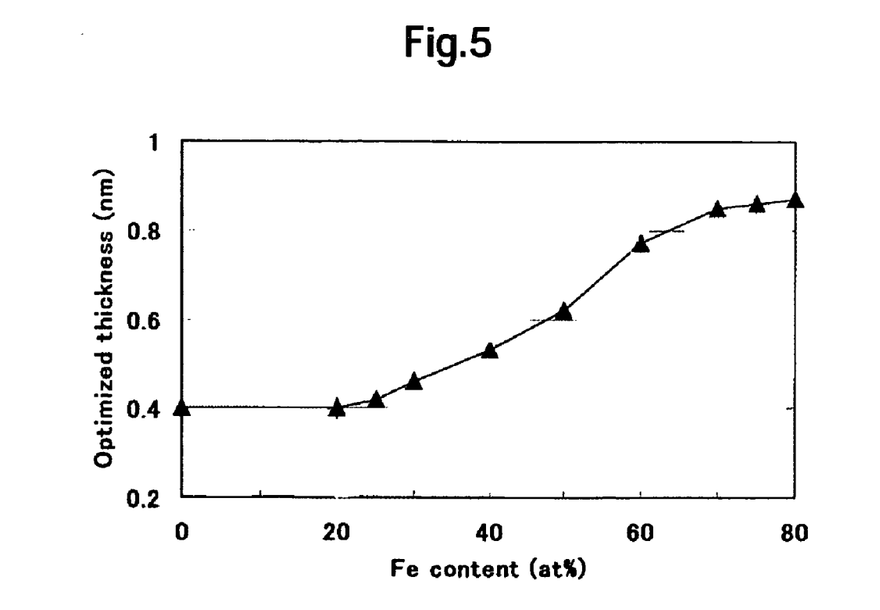
FIG. 5 is a graph showing a relation between the Fe additive amount in RuFe as an antiferromagnetic coupling layer and an optimized thickness of a perpendicular magnetic recording medium according to the first embodiment.
Figure 6:
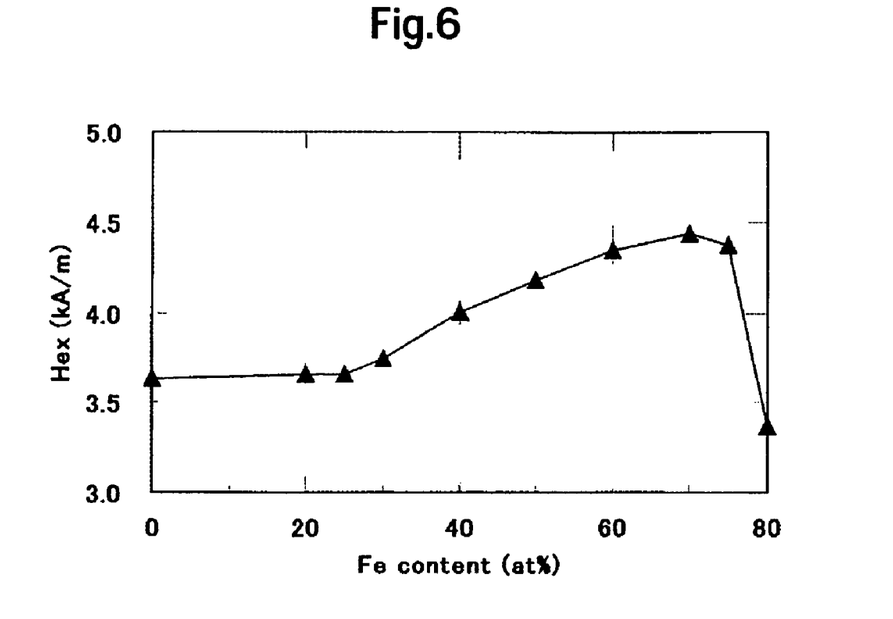
FIG. 6 is a graph showing a relation between the Fe additive amount in RuFe as an antiferromagnetic coupling layer and an antiferromagnetically coupled magnetic field Hex of a perpendicular magnetic recording medium according to the first embodiment.
Figure 7:
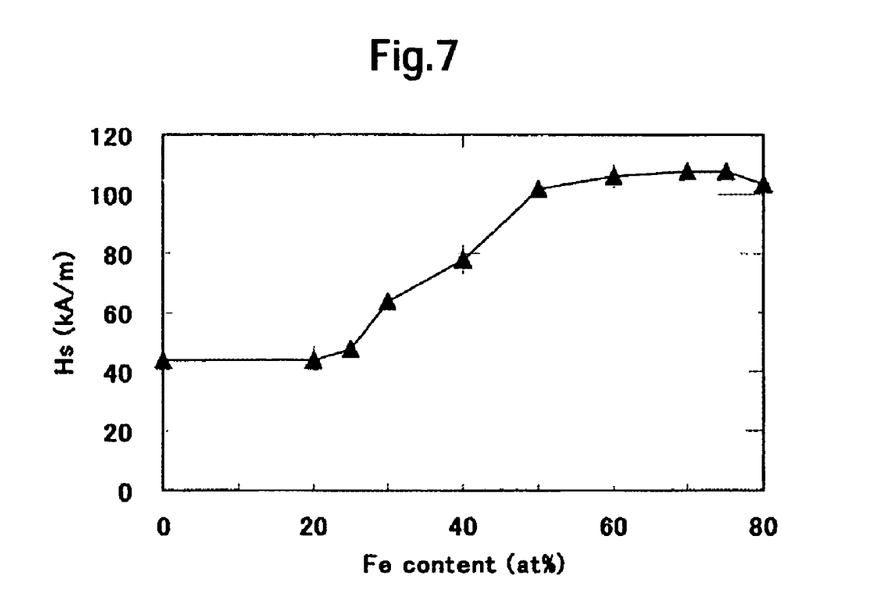
FIG. 7 is a graph showing a relation between the Fe additive amount in RuFe as an antiferromagnetic coupling layer and a saturation magnetic field Hs of a perpendicular magnetic recording medium according to the first embodiment.

Then, a relation between the Fe additive amount in RuFe, the peak value for Hex, and the optimized thickness for RuFe was examined more specifically. The result is shown in FIG. 5. The optimized thickness was scarcely changed from that of Ru up to 25 at % of the Fe additive amount, and the optimized thickness increased as the -additive amount of Fe was increased. It reached 0.85 nm at 75 at % and it was found that the thickness was doubled as compared with that of Ru. Then, a relation for Hex, Hs and Fe additive amount was examined. FIG. 6 shows a relation between the Fe additive amount and Hex and FIG. 7 shows the relation between the Fe additive amount and Hs. While both Hex and Hs change scarcely up to the Fe additive amount of 25 at % like the optimized thickness for RuFe, it tends to increase when the Fe additive amount exceeds 30 at %. Hex reaches the maximum about at 75 at % and it was found that Hex decreased conversely as the Fe additive amount was increased further. On the other hand, it was found that Hs is substantially saturated where the Fe additive amount exceeds 60 at %, and the value increases to 100 kA/m which is nearly three times as large as that for Ru.

For investigation of the cause of the phenomena described above, crystal orientation of RuFe was examined by XRD. For the evaluation, a sample in which AlTi was formed to 5 nm, FeCoTaZr was formed to 30 nm, and RuFe was formed to 20 nm above a substrate was used. As a result, it was found that RuFe for which large values were obtained both for Hex and Hs (Fe content: 75 at % or less) has an hcp structure identical with Ru, whereas the film with addition of 80 at % of Fe was in a mixed layer of the hcp structure and the bcc structure. Accordingly, it was found that the crystal structure of the film used for the antiferromagnetic coupling layer 132 has a desirable hcp structure.

Figure 8:
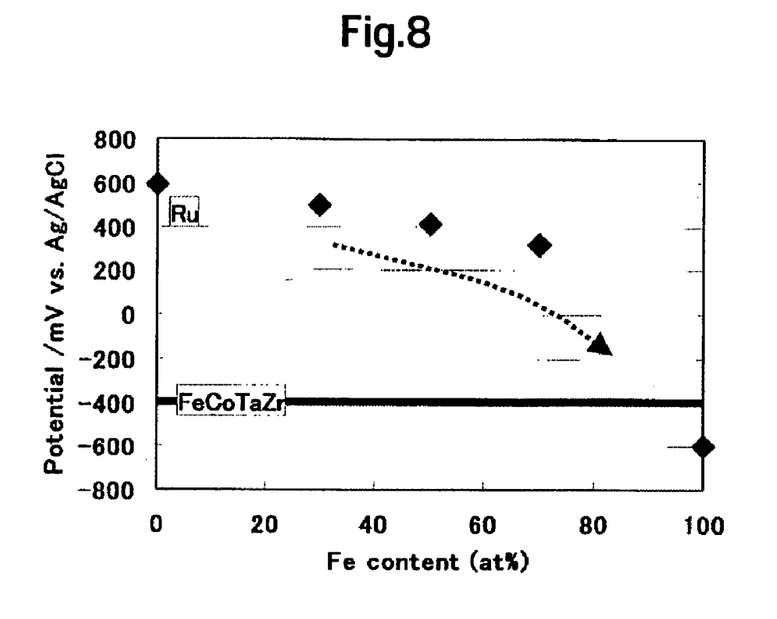
FIG. 8 is a graph showing a relation between the Fe additive amount in RuFe as an antiferromagnetic coupling layer and an immersion potential of a perpendicular magnetic recording medium according to the first embodiment.

Then, to examine the corrosion property of RuFe, an immersion potential measurement was conducted in an aqueous solution. For the test, a sample formed with AlTi to 5 nm and RuFe to 50 nm on a substrate was used. An aqueous solution of oxalic acid (pH3.1, temperature: 25° C.) was used for a test solution, and measurement was conducted for 10 min with a silver-chloride electrode (KCl saturated) being as a reference. The sample area was 1 cm$^2$ and other surfaces are coated. The result is shown in FIG. 8. For comparison, the potential for the FeCoTaZr film of the soft magnetic underlayer was also examined. Ru showed a high potential of about 600 mV and, on the other hand, the potential of FeCoTaZr was −400 mV which was considerably lower compared with that for Ru and it was found that the potential difference between both of them is large. That is, galvanic corrosion is caused due to the potential difference between both of them. As Fe was added to Ru, the potential lowered gradually and the galvanic corrosion occurred less as Fe was added more to expect that the corrosion resistance is improved.

Figure 9:
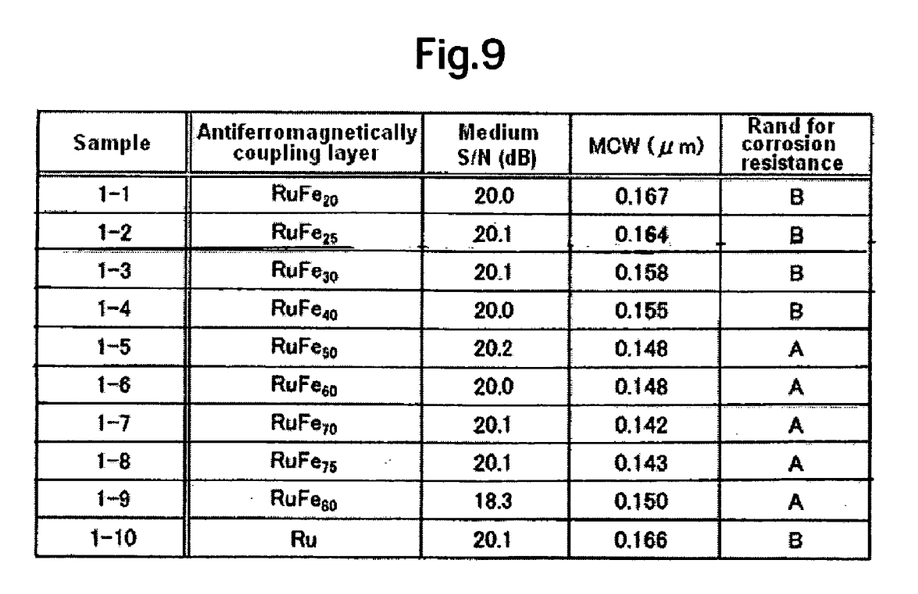
FIG. 9 is a view showing the result of evaluation for the R/W characteristic and the corrosion resistance of the perpendicular magnetic recording medium according to the first embodiment.

Media 1-1 to 1-9 in which the Fe additive amount of the antiferromagnetic coupling layer 132 was varied were provided and the RW characteristic and the corrosion resistance were evaluated. The results are shown collectively in FIG. 9. For comparison, a medium 1-10 using an Ru antiferromagnetic coupling layer was provided. It was found that the medium S/N was about identical for each of media but MCW showing the recording track width was narrowed as the Fe content was increased. The corrosion resistance was favorable for each of the media as B rank or higher not depending on the Fe content. The corrosion count tended to be decreased as the Fe addition amount increased more and was improved to the A rank level at 50% or more.

In view of the above, it was found that the Fe additive amount of RuFe as the antiferromagnetic coupling layer is preferably from 40 at % to 75 at %, desirably, from 50 at % to 75 at % for obtaining high medium S/N and narrow MCW.

As has been described above, according to the perpendicular magnetic recording media of the first embodiment, not only the medium noise due to the soft magnetic underlayer can be decreased but also the thickness of the nonmagnetic layer interposed between the soft magnetic underlayers can be controlled easily, blurring in writing by the head can be suppressed and the corrosion resistance of the soft magnetic underlayer can be improved.

Second Embodiment

Figure 10:
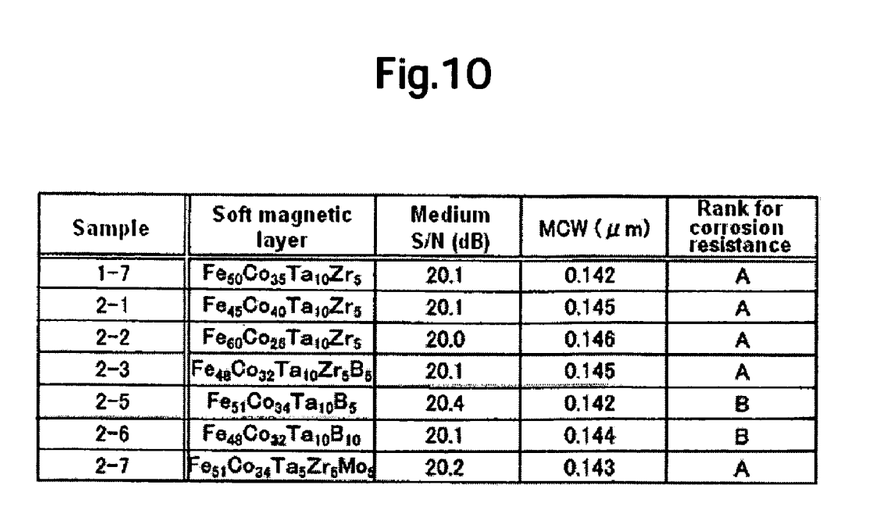
FIG. 10 is a view showing the result of evaluation for the R/W characteristic and the corrosion resistance of the perpendicular magnetic recording medium according to a second embodiment.

Media with the layer constitution identical with that in media 1 to 7 and different in the composition of the soft magnetic recording layer of the first embodiment were manufactured, and the RW characteristic was evaluated by the same method as in Example 1. The composition, thickness, and film deposition process for each of the layers other than the soft magnetic underlayer were identical with those in the first embodiment. FIG. 10 shows the composition of the soft magnetic layer for each of the samples (media) and the evaluation result for the RW characteristic. Samples 2-1 and 2-2 are an FeCoTaZr alloy and sample 2-3 is an FeCoTaZrB alloy, samples 2-5 and 2-6 are an FeCoTaB alloy, and sample 2-7 is an FeCoTaZrMo alloy. It was found that in each of the media, high medium S/N and narrow MCW were obtained, and the corrosion resistance was also favorable as B rank or higher.

Third Embodiment

Figure 11:
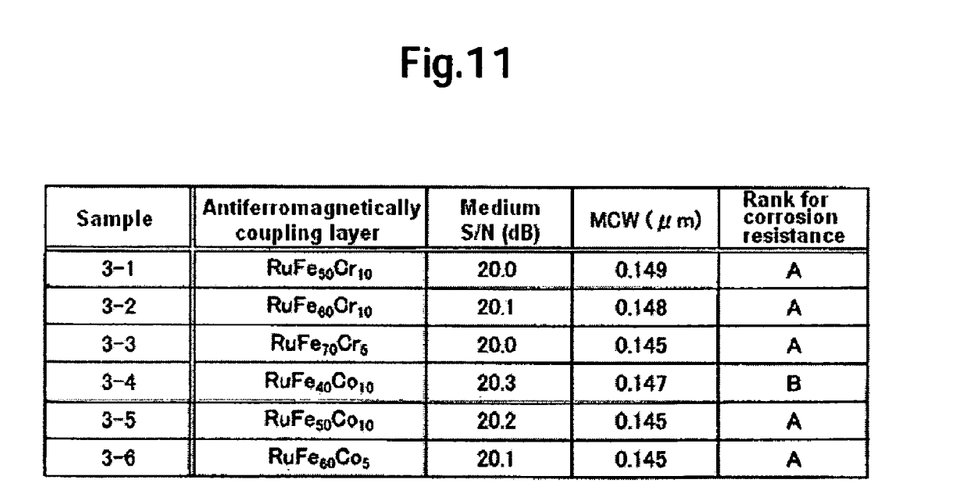
FIG. 11 is a view showing the result of evaluation for the R/W characteristic and the corrosion resistance of the perpendicular magnetic recording medium according to a third embodiment.

Media with the same layer constitution as that in the first embodiment in which Cr or Co was added to RuFe as the antiferromagnetic coupling layer 132 were manufactured. Addition of Cr has an effect for the corrosion resistance of a target and, on the other hand, addition of Co has an effect for the magnetic characteristic of the soft magnetic underlayer (high Hex, high Hs). The composition, thickness and film deposition process for each of the layers other than the antiferromagnetically coupling layer are identical with those in the first embodiment. FIG. 11 shows the compositions of the antiferromagnetic coupling layer for each sample (medium), and the result of evaluation for medium S/N and MCW evaluated by the same method as in the first embodiment. Samples 3-1 to 3-3 are RuFeCr alloy, and samples 3-4 to 3-6 are RuFeCo alloy. In each of the cases, high medium S/N and narrow MCW were obtained and the rank for the corrosion resistance was also favorable as B rank or higher. In particular, in a case of adding Cr, an effect of decreasing the corrosion count was observed. In view of the above, it was found that a high density perpendicular magnetic recording medium capable of decreasing the medium noise due to the soft magnetic underlayer, as well as capable of suppressing blurring in writing by a head, and also excellent in the corrosion resistance can be obtained even with addition of Cr or Co at about 5 to 10%.

What is claimed is:

1. A perpendicular magnetic recording medium, comprising:
   a substrate;
   a soft magnetic underlayer formed above the substrate; and
   a perpendicular recording layer formed above the soft magnetic underlayer,
   wherein the soft magnetic underlayer includes a first soft magnetic layer containing 45 at % to 60 at % Fe as a main ingredient, a second soft magnetic layer containing Fe as a main ingredient, and an antiferromagnetic coupling layer disposed between the first soft magnetic layer and the second soft magnetic layer; and
   wherein the anti ferromagnetic coupling layer is formed of an Ru—Fe alloy, and the Fe content is from 40 at % to 75 at %.

2. The perpendicular magnetic recording medium according to claim 1, wherein the Fe content in the antiferromagnetic coupling layer is from 61 at % to 75 at %.

3. The perpendicular magnetic recording medium according to claim 2, wherein the first and the second soft magnetic layers are microcrystalline.

4. The perpendicular magnetic recording medium according to claim 1, wherein the first and the second soft magnetic layers are amorphous, wherein the first soft magnetic layer contains 45 at %, 48 at %, 50 at %, 51 at % or 60 at % of Fe.

5. The perpendicular magnetic recording medium according to claim 1, wherein the perpendicular recording layer includes a first recording layer comprising an oxide, and a second recording layer formed directly upon the first recording layer.

6. The perpendicular magnetic recording medium according to claim 1, wherein the first soft magnetic layer contains 45 at % to 51 at % Fe.

7. The perpendicular magnetic recording medium according to claim 1, wherein the anti ferromagnetic coupling layer is formed of an Ru—Fe—Co alloy, and the Fe content is from 40 at % to 75 at %.

8. A perpendicular magnetic recording medium comprising:
   a substrate;
   a soft magnetic underlayer formed above the substrate; and
   a perpendicular recording layer formed above the soft magnetic underlayer,
   wherein the soft magnetic underlayer includes a first soft magnetic layer containing 45 at % to 60 at % Fe as a main ingredient, a second soft magnetic layer containing Fe as a main ingredient and an anti ferromagnetic coupling layer disposed between the first soft magnetic layer and the second soft magnetic layer;
   wherein the anti ferromagnetic coupling layer is formed of an Ru—Fe—Cr alloy, and the Fe content is from 40 at % to 75 at %,
   wherein the perpendicular recording layer includes a first recording layer comprising an oxide, and a second recording layer formed directly upon the first recording layer.

9. The perpendicular magnetic recording medium according to claim 8, wherein the Cr content of the antiferromagnetic coupling layer is from 5 at % to 10 at %, wherein the first soft magnetic layer contains 45 at %, 48 at %, 50 at %, 51 at % or 60 at % of Fe.

10. The perpendicular magnetic recording medium according to claim 8, wherein the first and the second soft magnetic layers are amorphous.

11. The perpendicular magnetic recording medium according to claim 8, wherein the first and the second soft magnetic layers are microcrystalline.

12. The perpendicular magnetic recording medium according to claim 8, wherein the Fe content in the antiferromagnetic coupling layer is from 61 at % to 75 at %.

13. The perpendicular magnetic recording medium according to claim 8, wherein the first soft magnetic layer contains 45 at % to 51 at % Fe.

* * * * *